(12) United States Patent
Millrod

(10) Patent No.: US 6,483,897 B1
(45) Date of Patent: Nov. 19, 2002

(54) METHOD AND APPARATUS FOR ANSWERING A TELEPHONE WITH SPEECH

(76) Inventor: David Millrod, 4 Birchwood Dr., Lawrenceville, NJ (US) 08648

( * ) Notice: Subject to any disclaimer, the term of this patent is extended or adjusted under 35 U.S.C. 154(b) by 0 days.

(21) Appl. No.: 09/220,619

(22) Filed: Dec. 24, 1998

Related U.S. Application Data

(60) Provisional application No. 60/068,859, filed on Dec. 29, 1997.

(51) Int. Cl.⁷ ................................................ H04M 1/64
(52) U.S. Cl. ..................................... 379/88.04; 704/275
(58) Field of Search .............................. 379/68, 70, 72, 379/74, 88.12, 88.16, 88.22, 88.23, 88.24, 88.26, 88.27, 88.28, 93.09, 372–377, 388.01–388.07, 373.01, 374.01, 374.02, 88.21; 704/275

(56) References Cited

U.S. PATENT DOCUMENTS

| | | |
|---|---|---|
| 2,826,636 A | 3/1958 | Beatty |
| 3,109,893 A | 11/1963 | Burns |
| 3,248,481 A | 4/1966 | Grote |
| 3,530,250 A | 9/1970 | Schaum |
| 3,626,098 A | 12/1971 | Lee |
| 3,662,111 A | 5/1972 | Rubinstein |
| 3,811,012 A | 5/1974 | Barber |
| 3,843,841 A | 10/1974 | Rubinstein |
| 3,889,059 A | 6/1975 | Thompson et al. |
| 3,925,622 A | 12/1975 | Robinson |
| 3,937,889 A | 2/1976 | Bell, III et al. |
| 3,970,786 A | 7/1976 | Randmere |
| 4,068,097 A | 1/1978 | Verriest |
| 4,126,771 A | 11/1978 | Proctor et al. |
| 4,137,429 A | 1/1979 | Stockdale |
| 4,172,967 A | 10/1979 | Porter et al. |
| 4,237,344 A | 12/1980 | Moore |
| 4,273,960 A | 6/1981 | Fahey et al. |
| 4,303,802 A | 12/1981 | Cumpston |
| 4,338,492 A | 7/1982 | Snopko |
| 4,338,493 A | 7/1982 | Stenhuis et al. |
| 4,361,730 A | 11/1982 | Barber et al. |
| 4,371,751 A | 2/1983 | Hilligoss, Jr. et al. |
| 4,375,637 A | 3/1983 | Desjardins |
| 4,399,331 A | 8/1983 | Brown et al. |
| 4,405,833 A | 9/1983 | Cave et al. |
| 4,414,432 A | 11/1983 | Skerlos et al. |
| 4,417,100 A | 11/1983 | Carlson et al. |
| 4,442,320 A | 4/1984 | James et al. |
| 4,450,320 A | 5/1984 | Ostermann et al. |
| 4,461,927 A | 7/1984 | Olson et al. |
| 4,467,142 A | 8/1984 | Rupp et al. |
| 4,491,970 A | 1/1985 | LaWhite et al. |
| 4,495,383 A | 1/1985 | Lubin et al. |
| D277,465 S | 2/1985 | MacDonald |
| 4,582,956 A * | 4/1986 | Doughty ................ 379/142.04 |
| 4,608,458 A | 8/1986 | Hashimoto |
| 4,689,813 A | 8/1987 | Pleska |
| 4,760,593 A | 7/1988 | Shapiro |
| 4,764,953 A | 8/1988 | Chern |
| 5,208,852 A * | 5/1993 | Tamura et al. .............. 379/353 |
| 5,325,421 A | 6/1994 | Hou |
| 5,335,261 A | 8/1994 | Fujinaka |
| 5,369,685 A | 11/1994 | Kero |
| 5,406,618 A | 4/1995 | Knuth |
| 5,422,939 A * | 6/1995 | Kramer et al. ......... 379/106.08 |

(List continued on next page.)

FOREIGN PATENT DOCUMENTS

| | | |
|---|---|---|
| EP | 17448 | 10/1980 |
| EP | 96401 | 12/1983 |
| GB | 2166321 A | 4/1986 |

Primary Examiner—Scott L. Weaver
Assistant Examiner—Roland G. Foster
(74) Attorney, Agent, or Firm—Ostrager Chong & Flaherty

(57) ABSTRACT

A telephone-answering device responsive to human speech answers a telephone with a pre-recorded message and places the caller on hold until the called party can physically reach a telephone.

19 Claims, 3 Drawing Sheets

U.S. PATENT DOCUMENTS

| | | | |
|---|---|---|---|
| 5,425,089 A | * 6/1995 | Chan et al. | 379/183 |
| 5,511,111 A | 4/1996 | Serbetcioglu | |
| 5,594,784 A | * 1/1997 | Velius | 379/159 |
| 5,604,790 A | * 2/1997 | Grimes | 379/88.04 |
| 5,615,271 A | 3/1997 | Stevens et al. | |
| 5,651,053 A | * 7/1997 | Mitchell | 379/142.01 |
| 5,703,931 A | 12/1997 | Martensson | |
| 5,924,146 A | 7/1999 | Martensson | |

* cited by examiner

METHOD AND APPARATUS FOR ANSWERING A TELEPHONE WITH SPEECH

This application claims the benefit of Provisional Patent Application Ser. No. 60/068,859, filed Dec. 29, 1997.

FIELD OF INVENTION

The present invention relates generally to voice-activated switches and telephone answering devices, specifically, the present invention relates to a voice-activated switch that answers the telephone with a pre-recorded message and places the caller on hold.

BACKGROUND OF INVENTION

Telephones traditionally use sound (e.g. ringing) to notify people that a caller is trying to connect to them, thereby notifying all people within hearing distance of the telephone. Furthermore, a limited amount of time is normally provided for answering the telephone, either by the calling party, by telephone answering devices or by the telephone network itself. Since traditionally, answering the telephone requires physically handling the telephone, time pressure is created by the need to move from a location within hearing distance of the telephone's ringing to the telephone itself. The effect of this time pressure ranges from occasional inconvenience for people who can move quickly, to frequently being unusable for people who's physical ability limits the speed with which they can answer the telephone. Other factors which add to the time pressure are being involved in a task which it is difficult or costly to immediately set aside when the phone rings, or tasks requiring hand washing prior to handling a telephone.

One commonplace response to these problems has been the cordless phone, which, if it is always kept close-by, eliminates the potential distance between the telephone and the called party. Limitations of this answer to the problem include the inconvenience of carrying the cordless phone with you, the need to eventually recharge it in its cradle (during which time it is not addressing the problem stated above), and the typical problem of forgetting where one has left it, potentially increasing the standard amount of time pressure to answer the phone.

Another widely available response to these problems is the return-call service provided by many local exchange carriers. This service allows one to easily call back a party who recently called, but you were unable to speak with due to difficulty in answering the phone in time. Disadvantages of this solution include additional fees payable to the carrier, limitations on its ability to return long-distance calls, inconvenience for the caller if they have needlessly left a recorded message, and some modest inconvenience and wasted time for the called party.

Telephone answering devices (TADs) are another partial solution to these problems by allowing extra time to pick up the phone while a caller leaves a message. Problems with this approach include the inconvenience caused to callers who needlessly attempt to create a message, the variable and potentially short amount of time gained while they are leaving the message, commonplace problems getting the TAD to stop when the phone is picked up, and the cases where callers hang up rather than needing to formulate and leave a message.

Several prior art devices attempt to solve these problems through the use of a remote-control switch, including U.S. Pat. No. 4,760,593 and German patent 2918494. As was noted regarding cordless phones, the need to carry around a device is in of itself an inconvenience, and sometimes results in the need to search for the remote control device. Furthermore, in an area where multiple people, including visitors may need to answer a phone, it is impractical to outfit all of them with remote control devices.

A commercial device that answers some of the issues raised in this discussion is a speakerphone by Southwestern Bell™, which answers incoming calls if it detects a sequence of handclaps. Disadvantages of this device, however, are the need to free the hands in order to clap, the physical skill required to clap loudly enough in the correct pattern, and the need to begin the conversation immediately, even if the called party does not want the caller to hear the other sounds that may be present in the area of the speakerphone.

SUMMARY OF INVENTION

Several objects and advantages of the present invention are:

(1) To provide physically disabled or elderly people with additional time to move to the location of a ringing telephone;

(2) To provide people with additional time to answer a ringing telephone even if they are a large distance from the location of the telephone;

(3) To provide people with additional time to answer a ringing telephone when they are performing a task that they do not want to immediately cease, or a task that requires hand washing prior to touching the telephone;

(4) To provide people with the opportunity to answer a telephone call in time, yet also have the time required to walk to a telephone extension of their choosing prior to beginning their conversation;

(5) To clearly relate to the calling party what is occurring when the phone is answered and placed on hold until the caller can arrive;

(6) To diminish the time pressure associated with answering a ringing telephone without requiring the called party to carry a physical device with them;

(7) To allow a ringing telephone to be answered from a distance without exposing the calling party to all of the sounds present in the vicinity of the telephone or telephone answering device;

(8) To diminish the time pressure associated with answering a ringing telephone without requiring the payment of per-use or subscription fees;

(9) To assist in the answering of a ringing telephone while minimizing the need to learn new physical skills toward this end;

(10) To provide a predictable additional period of time for answering a ringing telephone when it is desired, while minimizing the inconvenience on the calling party;

(11) To provide a method of remotely answering a ringing telephone while minimizing the likelihood of inadvertently triggering the answering device.

In accordance with a preferred embodiment of the present invention, a telephone-answering device is responsive to human speech, provides a message to callers, and places them on hold until the called party can physically reach a telephone.

Other objects, features and advantages of the present invention will be apparent when the detailed description of the preferred embodiments of the invention are considered in conjunction with the drawings which should be construed in an illustrative and not limiting sense as follows:

DESCRIPTION OF PREFERRED EMBODIMENT

Figure 1:
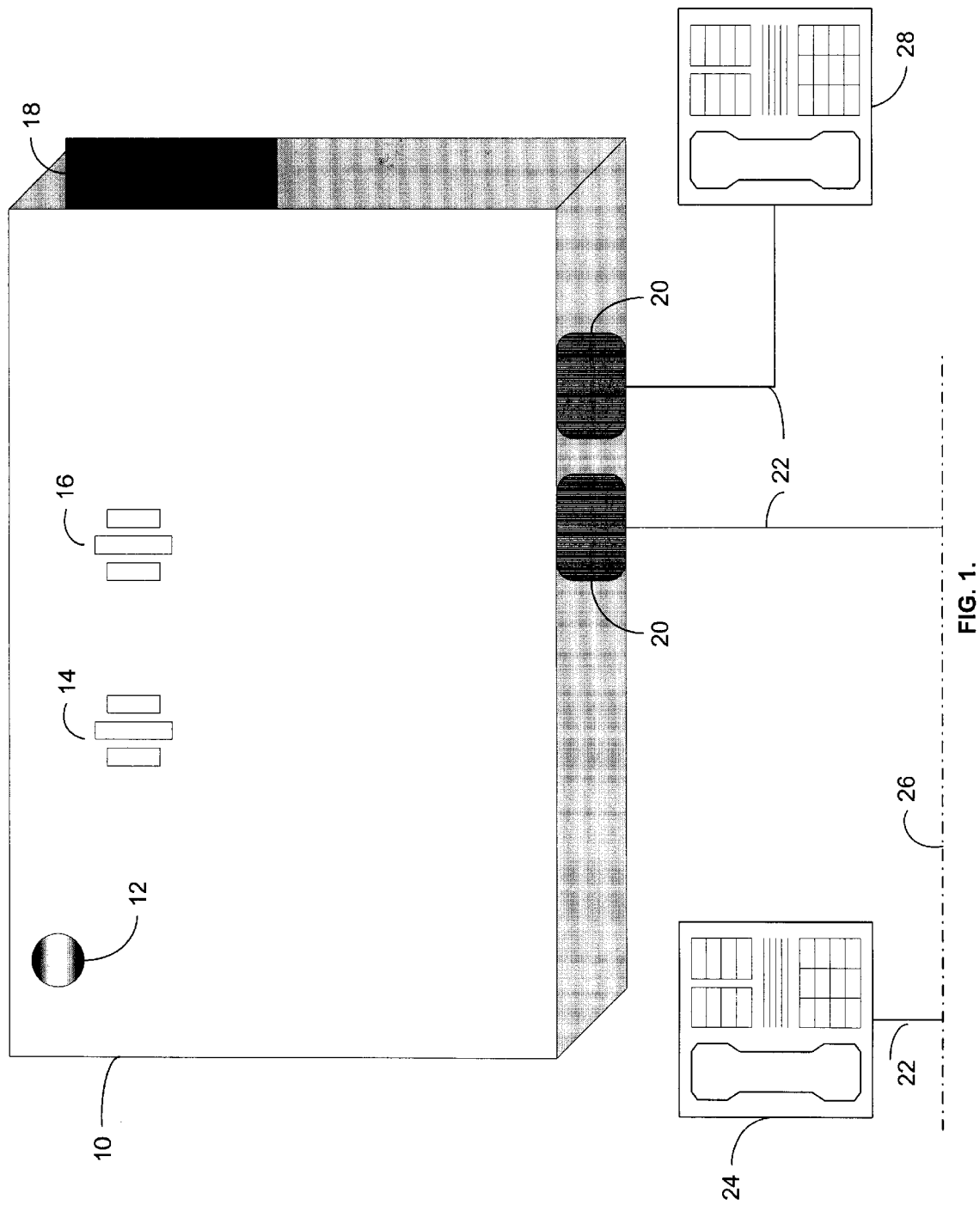
FIG. 1 is a perspective view of a preferred embodiment of the present invention and related telephony equipment.

FIG. 1 shows a perspective view of a preferred embodiment of a speech-activated telephone-answering device 10 according to the present invention, as well as related telephony equipment. Answering device 10 contains two telephone receptacles 20 for the purpose of interconnecting it with a telephone line 26, and optionally, with a telephone 28. These interconnections are made through the use of telephone cords 22. Telephone receptacles 20 are also directly interconnected with each other, allowing telephone 28 direct access to telephone line 26. Elsewhere, typically within the same building, a telephone 24 is optionally connected to telephone line 26 via telephone cord 22. As such, answering device 10, telephone 24, and telephone 28 share a common telephone line.

Within answering device 10, a visual indicator 12 is provided for the purpose of communicating the status of the device. In the preferred embodiment, an LED is utilized, however the indicator can consist of any electronic device capable of being seen by the user. An audio indicator 16 complements visual indicator 12 by also communicating status information about answering device 10. In the preferred embodiment, a piezoelectric element is utilized, however other sound producing electronic components could be substituted. A microphone 14 is provided to convert the sound waves in the vicinity to electrical signals. A removable panel 18 covers a battery compartment, within which a battery is inserted to provide power to answering device 10. In the preferred embodiment, a 9-volt transistor battery is utilized.

Figure 2:
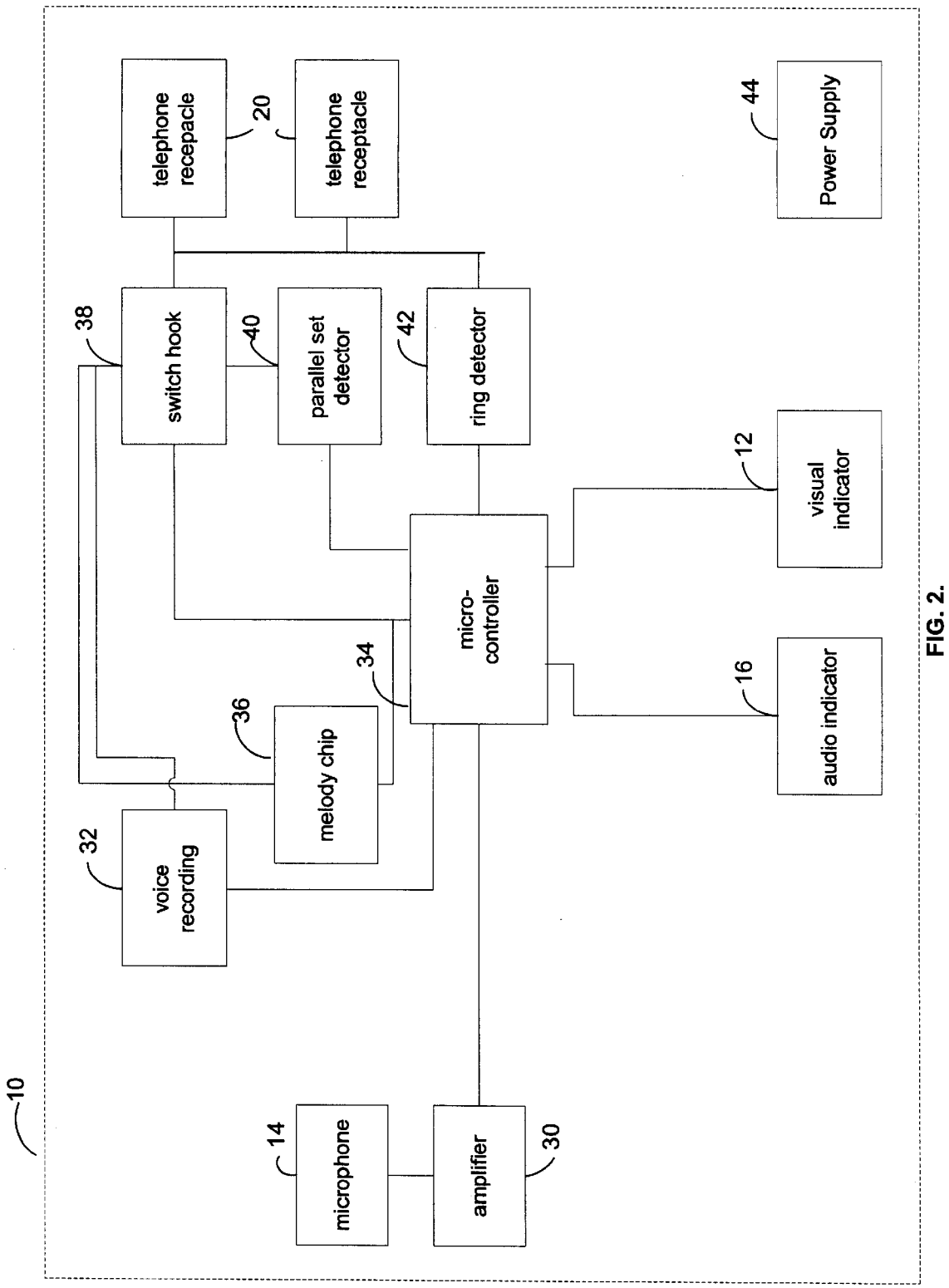
FIG. 2 is a block diagram of the electronic circuit of the embodiment of FIG. 1.

FIG. 2 is a block diagram of one embodiment of the electronic circuit for answering device 10 depicted in FIG. 1. A power supply 44 is comprised of a removable battery and voltage regulator circuitry, the combination of which provides a constant 5 Volt power source for powering any electronic components in answering device 10 that require an external power source.

A microcontroller 34 is a programmable microcontroller that comprises an analog-to-digital converter, a timer, a ROM memory, and a RAM memory.

Connected to telephone line 26 through either of telephone receptacles 20 is a switch hook 38, which under the control of microcontroller 34 is able to cause telephone line 26 to go off-hook when triggered, thereby signaling the telephone carrier that a call has been answered. Switch hook 38, when activated, also provides connectivity to telephone line 26 for a voice recording 32, a melody chip 36, and a parallel set detector 40.

Voice recording 32 is comprised of pre-recorded voice statements stored in memory, a digital-to-analog converter, and amplifier, and is capable of playing these voice statements under the control of microcontroller 34. The calling party can then hear the audio when switch hook 38 is activated.

Similarly, melody chip 36 is comprised of pre-recorded music stored in memory, a digital-to-analog converter, and amplifier, and is capable of playing this music under the control of microcontroller 34. The calling party can then hear the audio when switch hook 38 is activated.

Parallel set detector 40 is comprised of a capacitor and resistor which provide the analog-to-digital converter in microcontroller 34 with a DC voltage indicative of changes in the voltage of telephone line 26, which if of sufficient amplitude, indicate the presence of another telephony device (dubbed a parallel set) on the telephone line. Telephone 24 in FIG. 1, if utilized while answering device 10 is engaged, would be an example of a parallel set.

A ring detector 42 interconnects with telephone line 26 through telephone receptacle 20 and signals microcontroller 34 whenever a ringing signal is present on the telephone line.

Visual indicator 12 and audio indicator 16 both function under the control of microcontroller 34 for the purpose of communicating with the users of answering device 10.

Microphone 14 feeds its output signal to an amplifier 30, which is designed to increase the amplitude of the audio signal prior to its measurement by microcontroller 34. The amplifier is configured for a high degree of amplification in order to allow distant voice sounds (e.g. 30 feet away from answering device 10) to be adequately discerned by the analog-to-digital converter within microcontroller 34.

Figure 3:
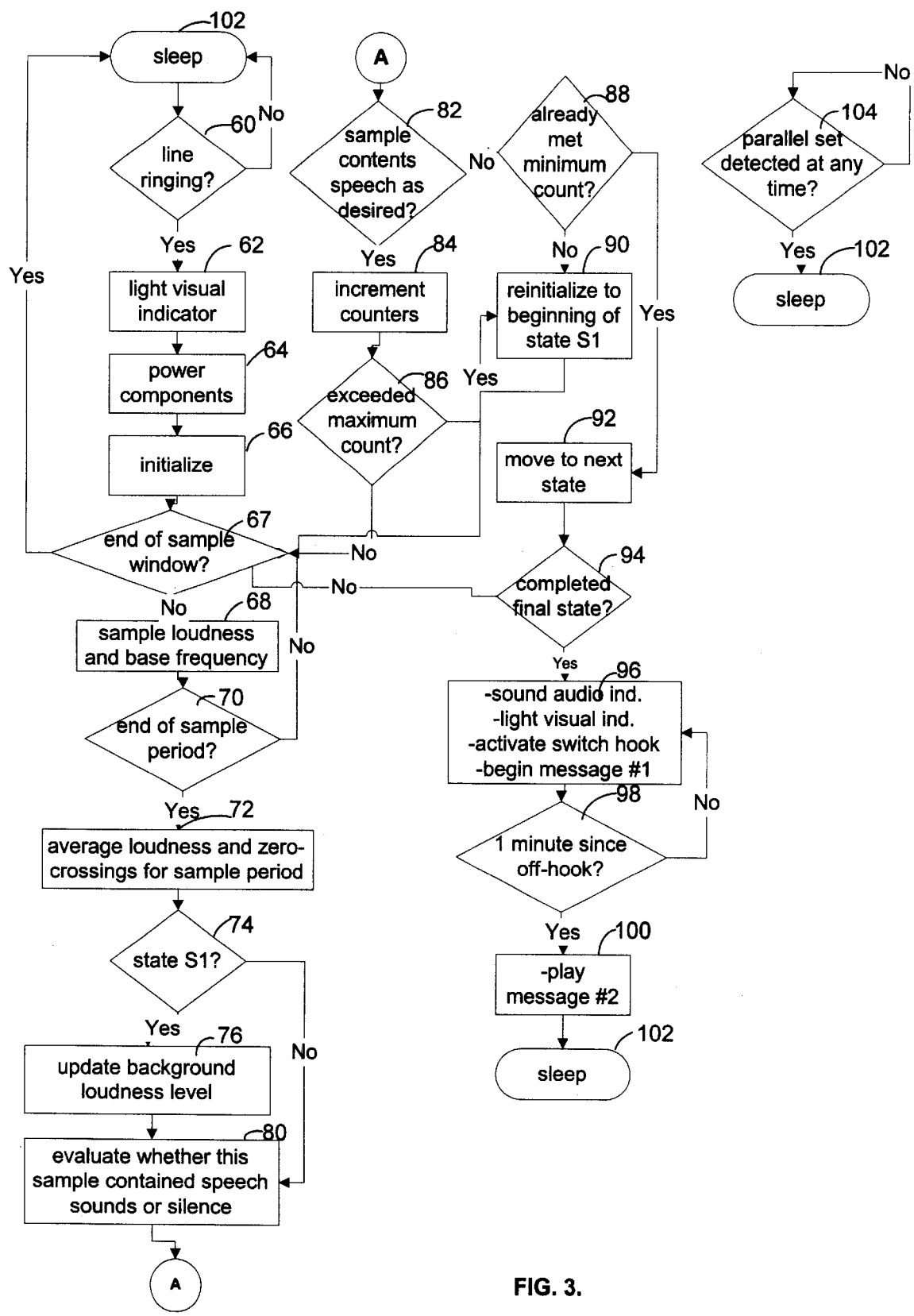
FIG. 3 is a flowchart of the functionality of the software program that controls one embodiment of the present invention.

FIG. 3 is a flowchart of the functionality of answering-device 10 according to one embodiment of the present invention. An initial block 102 sleep state removes power from all electronic devices other than microcontroller 34 and ring detector 42 in order to conserve battery power. A block 60 watches for high pulses from ring detector 42, indicating ringing on telephone line 26. A block 62 lights a visual alert by briefly supplying power to visual indicator 12. All electronic components not yet powered are provided with power in a block 64. All timers and counters are initialized in a block 66. In a block 67, a timer is interrogated in order to determine how much time has elapsed since the most recent ring was detected. In the preferred embodiment, this time limit is set to 4 seconds.

In a block 68, the loudness and base frequency of the sounds input from microphone 14 via amplifier 30 is measured. This is accomplished by reading the value of the analog-to-digital converter, then determining the absolute difference of this value from the converter value believed to represent silence (typically the midpoint of the range of possible converter values), and known as the zero line. Further, if the current reading is on the opposite side of this zero line from the reading that preceded it, a zero-crossing counter is incremented.

In a block 70, a timer is evaluated in order to determine whether enough time has elapsed for the system to conclude the current sampling period and evaluate the results of that period. In the preferred embodiment, the length of a sample period is set at 32 milliseconds. In a block 72, the loudness and zero-crossing values calculated in block 68 are averaged and stored in an array in memory.

The system maintains track of which of several discrete states it is currently in. These states correspond to periods of relative silence and sound that it determines to exist. The first of these states is S1, representing the initial silence prior to the beginning of a word. In a block 74, the system checks whether it is currently in state S1. If it is, a block 76 will be executed, which updates the background loudness level by updating a moving average of the loudness samples stored in block 72. In the preferred embodiment, this moving average contains 15 of these loudness samples.

In a block 80, the loudness and zero-crossing averages stored in block 72 are evaluated in order to determine whether to classify the sample period which just ended as being silence or speech sounds. The two criteria of loudness and zero-crossings are independently evaluated and must both indicate speech sounds, or else the period is considered to be silence. The criterion for the loudness measurement is for it to be sufficiently greater than the background loudness level stored in block 76. In the preferred embodiment, a difference of 2 between these 8-bit variables is considered sufficient to consider the sample speech sound. The zero-crossing value roughly indicates the base frequency of the sound being measured, and in the preferred embodiment is required to be within the range of 2 to 45. If both of these criteria are met, the sample is considered to contain speech sounds.

The system is programmed to attempt to recognize the sound and silence pattern (i.e. cadence) of a particular keyword. Each silence or sound portion of the word is mapped to a device state, with the initial silence before a word being state S1. These states are either silence states or speech states. In a block 82, a determination is made as to whether the contents of the current sample, as identified in block 80, matches the type of state the device is currently in (silence or speech). A match causes a block 84 to increment the current state's count of samples. In a block 86, this count is compared with the preset maximum for the current state, and in block 88, it is compared with the preset minimum for the current state. When through the actions of blocks 86 and 88 it becomes apparent that the current sounds do not match the stored pattern of silences and sounds, a block 90 reinitializes the device's state to beginning state S1. Conversely, a block 92 causes the device's current state to progress to the next possible state. A block 94 checks whether the current state is in fact the final necessary state, indicating that the expected keyword has been heard. In the preferred embodiment, the keyword 'telephone' has been selected, and its pattern of relative segments of sound and silence stored in the device.

A block 96 indicates that the expected keyword has been heard by momentarily applying power to audio indicator 16 and visual indicator 12. Telephone line 26 is placed off-hook by switch hook 38. In addition, the first message in voice recording 32 is begun. In the preferred embodiment, this voice recording indicates to the calling party that the called party will soon be at the phone. Subsequent to the playing of this message, melody chip 36 provides music to the calling party while they are kept on hold. Message #1 and the melody chip continue to alternate according to the programmed time constants while the caller is on hold. Similarly, audio indicator 16 is periodically sounded to alert the called party that a call is on hold.

A block 98 checks the value of a timer to determine whether sufficient time has elapsed since block 96 was executed for message #2 to be played in a block 100. This is accomplished by signaling voice recording 32 to cue to the proper message within its storage. In the preferred embodiment, this occurs after one minute, and message #2 apologizes to the caller that the called party could not come to the telephone and asks them to try again later. The device then returns to sleep state 102, which places telephone line 26 back on hook.

At all times that the device is off-hook, the presence of a parallel set is watched in the output of parallel set detector 40, a situation which invokes sleep state 102.

The operation of a preferred embodiment will now be described with reference to FIGS. 1 to 3. When telephone line 26 is called, ring detector 42 signals block 60. Block 62 lights visual indicator 12, block 64 powers any powered off components, and block 66 initializes variables & timers.

The output of microphone 14 is increased by amplifier 30, and block 68 repeatedly samples it, storing the loudness and zero-crossing results. When block 70 determines that a full sample period has elapsed, block 72 averages all of the samples taken by block 68. If block 74 determines the device is in state S1, the silent period before a word begins, block 76 updates a moving average of the background loudness level. Block 80 then evaluates the current sample period's loudness and zero-crossing levels and determines whether it will be considered speech or silence.

Block 82 then determines whether this sample period's type (silence or speech) matches the type of state the system is in. If it matches, block 84 increments a counter, and block 86 determines if that number of samples of that type is excessive for the keyword desired. If so, the system's state is reset to S1 by block 90.

If block 82 determines that the sample type is different than the current state's type, block 88 checks whether the minimum number of samples for the desired keyword have been satisfied. If they have not, the system's state is reset to S1 by block 90. If they have, block 92 moves the system to its next state. If block 94 determines that this is the final required state (the silence after the keyword), the system proceeds with tasks associated with having been activated by the called party. If this does not occur quickly enough after the most recent ring, block 67 causes the device to sleep in block 102.

Having determined that it has received its keyword command, block 96 causes switch hook 38 to take telephone line 26 off-hook, causes audio indicator 16 to sound momentarily, causes visual indicator 12 to light momentarily, and causes voice recording 32 to play message #1 to the calling party. At the end of message #1, melody chip 36 is activated in order to provide the calling party with music while on hold. Message #1 and the melody are alternated until block 98 determines that one minute has elapsed since going off-hook, at which time block 100 causes voice recording 32 to play message #2, asking the caller to try again later. Block 102 then causes the system to sleep.

At any time while off-hook, if block 104 is signaled by parallel set detector 40 that a telephone has been picked up on line 26, block 102 will cause the unit to sleep, allowing the call to proceed uninterrupted.

In a very closely related embodiment, answering device 10, is integrated and fully contained within telephone 28. In this case, both devices share a single telephone cord 22 via a single telephone receptacle 20 to connect to telephone line 26.

Another embodiment that involves the integration of the invention with related telephony equipment is its integration with a standard telephone answering device (TAD). If a phone is unanswered, and the keyword is not detected by answering device 10, the TAD can answer the call and offer to record a message as is customary. The TAD can also be activated in block 100 instead of playing message #2, thereby allowing a message to be left by the calling party if answering device 10 has been activated by a keyword, yet no one answers a telephone on telephone line 26 prior to block 98 confirming that a minute has elapsed since device 10 answered the call.

Thus the reader will see that the answering device of the invention provides a new, more convenient method of answering a telephone call. Through the ability to speak a keyword from a distance, rather than physically touch a ringing telephone in order to answer it, the time pressure to answer a call in time is greatly minimized. The benefit of this lessened time pressure ranges from being a convenience to agile individuals to being nearly essential for elderly or physically disabled people.

While my above description contains much specificity, this should not be construed as a limitation on the scope of the invention, but rather as an exemplification of one preferred embodiment thereof. Many other variations are possible. For example, the combination of the invention with talking caller-id, as well as a conventional telephone answering device would be particularly effective, for it would allow calls to be remotely screened and either accepted (via a keyword), or allowed to trigger the telephone answering device, depending upon the desires of the called party. In addition, while the preferred embodiment uses the word "telephone" as a keyword, other words or phrases could easily be programmed into the invention according to the processes specified. All such variations and modifications are intended to be within the scope and spirit of the invention.

I claim:

1. A sound activated telephone answering device for use with a land-line telephone by a call recipient for receiving telephone calls from a telephone, comprising:
   a) a microcontroller for recognizing a pattern of sound signals and absence of sound signals within a predetermined amount of time for determining whether enough time has elapsed for said microcontroller to conclude a current sampling period and to evaluate results of said period, said microcontroller placing the device in a first off-hook mode upon recognizing said pattern of sound signals, and a second automatic answer mode when recognizing the absence of said sound signals;
   b) a sound receiver for detecting said pattern of sound signals or absence thereof to place said microcontroller in said first off-hook mode or said second automatic answer mode;
   c) a ring detector for detecting a call from a caller on a telephone line, and then signaling said microcontroller to enter a mode wherein it receives sound signals from said sound receiver;
   d) a switch hook for opening a telephone connection between said sound activated telephone answering device and said telephone when said microcontroller is in said off-hook mode; and
   e) a playback device actuated by said microcontroller for playing a message over the telephone, such that said call recipient may remotely actuate the microcontroller to open a telephone connection and communicate said message to the caller for delayed pick-up by said call recipient of said telephone call, or alternatively provide for said automatic operation of said telephone.

2. The sound activated telephone answering device of claim 1, further comprising: an amplifier for receiving and amplifying the sound signal from the sound receiver and sending an amplified sound signal.

3. The sound activated telephone answering device of claim 1, further comprising: a melody chip for playing a musical sound over the telephone line after a particular voice recording is played.

4. The sound activated telephone answering device of claim 1, further comprising: a parallel set detector for stopping the message from playing when a telephone extension is used to open a connection on the telephone line.

5. The sound activated telephone answering device of claim 1, further comprising: an audio indicator for emitting a sound when the microcontroller recognizes a specific sound signal pattern.

6. The sound activated telephone answering device of claim 1, wherein the sound is speech.

7. A sound activated telephone answering system for use by a call recipient for receiving telephone calls from a telephone, comprising:
   a) a land-line telephone for receiving said telephone calls;
   b) a microcontroller for recognizing a pattern of sound signals and absence of sound signals within a predetermined amount of time for determining whether enough time has elapsed for said microcontroller to conclude a current sampling period and to evaluate results of said period, said microcontroller being connected to said telephone for placing said telephone in a first off-hook mode upon recognizing said pattern of sound signals, and a second automatic answer mode when recognizing the absence of said sound signals;
   c) a sound receiver for detecting said pattern of sound signals or absence thereof to place said microcontroller in said first off-hook mode or said second automatic answer mode;
   d) a ring detector for detecting a call from a caller on a telephone line, and then signaling said microcontroller to enter a mode wherein it receives sound signals from said sound receiver;
   e) a switch hook for opening a telephone connection between said telephone and said telephone when said microcontroller is in said off-hook mode; and
   f) a playback device actuated by said microcontroller for playing a message over the telephone line, such that said call recipient may remotely actuate said microcontroller to open said telephone connection and communicate said message to the caller for delayed pick-up by said recipient of said telephone call, or alternatively provide for said automatic operation of said telephone.

8. The sound activated telephone answering system of claim 7, further comprising: an amplifier for receiving and amplifying the sound signal from the sound receiver and sending an amplified sound signal.

9. The sound activated telephone answering system of claim 7, further comprising: a melody chip for playing a musical sound over the telephone line after a particular message is played.

10. The sound activated telephone answering system of claim 7, further comprising: a parallel set detector for stopping the message from playing when a telephone extension is used to open a connection on the telephone line.

11. The sound activated telephone answering system of claim 7, further comprising: an audio indicator for emitting a sound when the microcontroller recognizes a specific sound signal pattern.

12. The sound activated telephone answering system of claim 7, further comprising a device to record and playback messages from callers.

13. The sound activated telephone answering system of claim 12, further comprising a caller-id device.

14. The sound activated telephone answering system of claim 7, wherein the sound is speech.

15. A method for sound activated answering a land-line telephone connected to a telephone line placed from a telephone, comprising the steps of:

a) providing a microcontroller for recognizing a pattern of sound signals and absence of sound signals within a predetermined amount of time for determining whether enough time has elapsed for said microcontroller to conclude a current sampling period and to evaluate results of said period, said microcontroller being connected to said land-line telephone in a first off-hook mode upon recognizing said pattern of sound signals, and a second automatic answer mode when recognizing the absence of said sound signals;

b) providing a sound receiver for detecting said pattern of sound signals or absence thereof to place said microcontroller in said first off-hook mode or said second automatic answer mode;

c) detecting a call on the telephone from a caller, and then signaling said microcontroller to enter a mode wherein it receives sound signals from said sound receiver;

d) opening a telephone connection between said land-line telephone and said telephone when said microcontroller is in said off-hook mode; and e) providing a playback device actuated by said microcontroller for playing a message over said telephone line, such that the call recipient may remotely actuate said microcontroller to open a telephone connection and communicate said message to the caller, or alternatively provide for said automatic operation of said telephone.

16. The method of claim 15, further comprising: receiving and amplifying the sound signal and sending an amplified sound signal.

17. The method of claim 15, further comprising: playing a musical sound over the telephone line after a particular message is played.

18. The method of claim 15, further comprising: stopping the message from playing when a telephone extension is used to open a connection on the telephone line.

19. The method of claim 15, further comprising: emitting an audible sound when a specific sound signal pattern is recognized.

* * * * *